US011499722B2

(12) United States Patent
Johnson et al.

(10) Patent No.: US 11,499,722 B2
(45) Date of Patent: Nov. 15, 2022

(54) HOUSEHOLD COOKING APPLIANCE HAVING AN OVEN DOOR WITH AN INTERIOR CAMERA

(71) Applicants: BSH Home Appliances Corporation, Irvine, CA (US); BSH Hausgeräte GmbH, Munich (DE)

(72) Inventors: Sean Johnson, New Bern, NC (US); Kenneth Jones, Washington, NC (US); Robert Parchman, Newport, NC (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 300 days.

(21) Appl. No.: 16/862,621

(22) Filed: Apr. 30, 2020

(65) Prior Publication Data

US 2021/0341152 A1     Nov. 4, 2021

(51) Int. Cl.
| F24C 15/04 | (2006.01) |
| H04N 5/64 | (2006.01) |
| F24C 7/08 | (2006.01) |
| H04N 5/225 | (2006.01) |
| F23M 7/00 | (2006.01) |
| H04N 101/00 | (2006.01) |

(52) U.S. Cl.
CPC ............ *F24C 15/04* (2013.01); *F24C 7/085* (2013.01); *H04N 5/2257* (2013.01); *H04N 5/64* (2013.01); *H04N 2101/00* (2013.01)

(58) Field of Classification Search
CPC ....... F24C 15/04; F24C 7/085; H04N 5/2257; H04N 5/64; H04N 2101/00

USPC ........ 126/200, 198, 192; 386/200, 210, 223, 386/224, 226
See application file for complete search history.

(56) References Cited

U.S. PATENT DOCUMENTS

| 6,559,882 B1 | 5/2003 | Kerchner |
| 6,853,399 B1 | 2/2005 | Gilman et al. |
| 9,219,876 B1 | 12/2015 | Umana |
| 10,117,294 B2 | 10/2018 | Beifuss et al. |
| 2017/0099988 A1 | 4/2017 | Matloubian et al. |

FOREIGN PATENT DOCUMENTS

| EP | 2515044 A1 | 10/2012 |
| JP | WO-2017082603 A1 * | 5/2017 |
| JP | WO-2019022410 A1 * | 1/2019 |
| JP | 3450854 A1 * | 3/2019 |

(Continued)

OTHER PUBLICATIONS

Candy S.p.A., Watch-Touch Oven, Online: Candy.ae,Accessed May 29, 2019.

*Primary Examiner* — Robert Chevalier
(74) *Attorney, Agent, or Firm* — Michael E. Tschupp; Andre Pallapies; Brandon G. Braun

(57) ABSTRACT

A household cooking appliance includes a housing having an oven chamber accessible through an opening and an oven door covering the opening and moveable about a hinge between an open position and a closed position. The oven door includes an inner surface that faces the oven chamber and is directly exposed to heating of the oven chamber when the door is in the closed position. The inner surface of the oven door includes a camera configured to capture video of an interior of the oven chamber before, during, or after a cooking operation without violating privacy.

16 Claims, 16 Drawing Sheets

(56) References Cited

FOREIGN PATENT DOCUMENTS

| JP | WO-2019153711 A | * | 8/2019 |
| JP | 2710420 C2 | * | 12/2019 |
| KR | 20060003241 A | | 1/2006 |
| WO | 2017020308 A1 | | 2/2017 |

* cited by examiner

HOUSEHOLD COOKING APPLIANCE HAVING AN OVEN DOOR WITH AN INTERIOR CAMERA

FIELD OF THE INVENTION

The present invention is directed to a household cooking appliance having an oven door with a camera, and more particularly, to a household cooking appliance having an oven door with a camera configured to capture video of an interior of the oven chamber without risking a violation of a user's privacy.

BACKGROUND OF THE INVENTION

Conventional home cooking appliances, such as ovens and ranges, commonly include an oven door with a glass pack, such as a plurality of glass panels, to permit viewing an interior of the over chamber, such as during a cooking operation.

SUMMARY OF THE INVENTION

The present invention is directed to a household cooking appliance including a housing having an oven chamber accessible through an opening, and an oven door covering the opening and moveable about a hinge between an open position and a closed position, the oven door including an inner surface that faces the oven chamber and is directly exposed to heating of the oven chamber when the door is in the closed position, the inner surface including a camera configured to capture video of an interior of the oven chamber. In this way, the video imagery captured by the camera can be displayed to a user such that the user can observe the inside of the oven chamber without opening the oven door, for example, to view the contents of the oven chamber such as food, packaging, cookware, etc. before, during, or after a cooking operation. Additionally, a conventional glass pack no longer needs to be provided in the oven door for a user to view an interior of the oven chamber during a cooking operation being performed in the oven chamber without opening the oven door. The present invention recognizes that a glass pack of an oven door is one of the regions of heat loss (e.g., greatest heat loss) for an oven. By either eliminating the glass pack altogether, or in some exemplary embodiments substantially reducing a size of the glass pack, and instead, providing a highly thermal resistant material within the door in the location where the conventional glass pack otherwise would have been provided, the present invention can minimize or reduce an amount of heat loss through the oven door, thereby providing for improved thermal efficiency within the oven chamber and reducing an amount of energy required to maintain temperature control inside the oven chamber, etc. The present invention also can reduce or eliminate a need for excess thermal management systems. Additionally, the present invention may lower exterior door skin temperatures, thereby improving safety of the cooking appliance and improving compliance with industry standards and regulations. In this way, the present invention can reduce or minimize heat loss through the oven door while retaining the ability for a user to view the contents of the oven chamber such as food within the oven chamber while the food is cooking. Also, the elimination of the glass pack in combination with the lower exterior door skin temperatures also can permit the safe use of custom door skins, such as wood cabinet door panels, on an exterior surface of the oven door, thereby enabling the household cooling appliance to be visually integrated into the kitchen cabinetry.

The camera can be mounted on a surface of the oven door, or integrated into the surface of the oven door, that faces the oven chamber when the oven door is closed. The camera can be specifically designed for use in high temperature environments and/or can include a shielding for protecting the camera or its components from the high temperature environment within the oven chamber such that the camera is capable of capturing video imagery from within the oven chamber during a cooking operation (e.g., during a preheat operation, a high temperature cooking operation, etc.) while being protected from heat damage.

In an exemplary embodiment, the oven door can include a display (e.g., a video display screen) mounted on the outside of the oven door. For example, in one example, a display can be mounted directly to the exterior skin of the oven door. In another example, a display can be disposed or mounted remotely from the oven door, such as on another part or area of the household cooking appliance, on another household appliance, or on another surface or component such as a kitchen cabinet, kitchen wall, etc. The display can be configured to display a video feed received from the camera. In another example, the display can be configured to receive and display content from other sources in addition to the interior camera.

For example, the camera (or a control unit or system of the household cooking appliance configured to control the camera) can be configured to transmit (e.g., via wired or wireless communication) the video imagery captured by the camera (e.g., a signal or data representing the video imagery) to a display on the home cooking appliance, such as on an exterior surface of the oven door or integrated into the control panel, or to one or more of a display on another household appliance, a display on another surface or component such as a display on a kitchen cabinet, kitchen wall, etc., or a display of another device, such as a smart phone, tablet computer, notebook computer, personal computer, etc.

Additionally, the display (or a control unit or system of the household cooking appliance configured to control the display, which can include a communications unit, such as a wired or wireless communications unit) can be configured to receive (e.g., via wired or wireless communication) and display content from other sources in addition to the camera of the household cooking appliance. For example, the content from other sources can include stock or custom "sleep mode" screens including nature, sports teams, nature scenes, personal photos/videos, etc., as selected by a user, or video imagery from an adjacent household appliance, such as an adjacent oven.

As explained, the video imagery captured by the camera can be displayed to a user such that the user can observe the inside of the oven chamber, for example, before, during, or after a cooking operation. In an exemplary embodiment, the camera can be configured to be operable (e.g., locally or remotely activated and/or controlled) in instances in which the appliance is in operation (e.g., a heating element, fan, and/or another device of the oven is on) as well as in instances when the appliance is not in operation (e.g., a heating element, fan, and/or another device of the oven is off). For example, the camera can be configured to be operable when the oven is off such that a user can remotely view the interior of the oven chamber before remotely initiating operation of the cooking appliance, such as remotely starting a preheat function, remotely starting a baking or cooking process, etc. In this way, the household cooking appliance can enable a user to remotely operate the camera and remotely view the interior of the oven chamber before remotely initiating a cooking operation. For example, a user can confirm whether the oven chamber is empty before remotely initiating a preheat function, or a user can confirm whether another user, such as a child, has removed the foodstuff from its packaging before placing the foodstuff in the oven chamber, such as whether a frozen lasagna, frozen pizza, etc. has been removed from its plastic or cardboard box packaging, before remotely initiating a cooking operation, thereby improving safe operation of the appliance.

The present invention recognizes that household cooking appliances can have various configurations, such as a wall oven, a baking oven or steam oven integrated into a cooking range, or a countertop oven. Additionally, such ovens can have various door configurations such as one or more vertical swing doors or side swing doors. The present invention further recognizes that the provision of a camera on a door of a household appliance may result in the camera facing areas other than the interior of the oven chamber when the door is in an open position, thereby risking a user's privacy being compromised. The present invention further solves these and other problems by providing a household cooking appliance having a privacy control system configured to protect a user's privacy from the inadvertent capture of video imagery from areas outside of the oven chamber. For example, an embodiment of a household cooking appliance can include a control unit that only enables the camera to be activated when the oven door is in the closed position. That is, the camera is de-activated (or prevented from being activated) when the door is moved away from the closed position (i.e., when the door is in an open or partially open position) and only activated (or capable of being activated) when the door is in the closed position. The household cooking appliance can include, for example, a door position sensor in communication with the control unit, in which the door position sensor is configured to detect when the oven door is one of in an open position, or partially open position, and the closed position. The door position sensor is not limited to any particular type of position sensor. The present invention recognizes that various position sensors may be suitable for detecting a position of the oven door (e.g., a closed position, partial open position, fully open position, etc.). For example, the door position sensor can include a mechanical sensor, such as a mechanical plunger-style door position sensor that is physically contacted and depressed by a surface of the oven door or another part of the oven door when the oven door is moved into the closed position, an optical sensor configured to detect a position of the oven door, an angle sensor configured to detect a position of the oven door or a hinge of the door, etc. Other sensors also can be used to detect the closure of the oven door.

Some appliances include door position sensors used for other purposes, such as turning on and off interior lights within the oven cavity during opening and closing of the oven door. The present invention can take advantage of such door position sensors already present for other purposes and configure them for use as part of a privacy control system for controlling the operation of the camera.

In this way, the present invention can provide a household cooking appliance including a camera on an inner surface of the oven door, in which the camera is configured to capture video of an interior of the oven chamber before, during, or after a cooking operation being performed in the oven chamber and display captured video to a user, for example, via a display on the household cooking appliance, a display on another household appliance, or on a display of a portable device such as a smart phone, notepad computer, notebook computer, etc., while minimizing or eliminating a risk of privacy violations.

As explained, the appliance can be configured such that the camera can be operated (e.g., locally or remotely activated and/or controlled) in instances in which the appliance is in operation (e.g., a heating element, fan, and/or another device of the oven is on) as well as in instances when the appliance is not in operation (e.g., a heating element, fan, and/or another device of the oven is off). In such examples, the privacy control system of the household cooking appliance can protect from the inadvertent capture of video imagery from areas outside of the oven chamber in instances in which the appliance is on or off.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION OF THE EXEMPLARY EMBODIMENTS OF THE INVENTION

Figure 1:
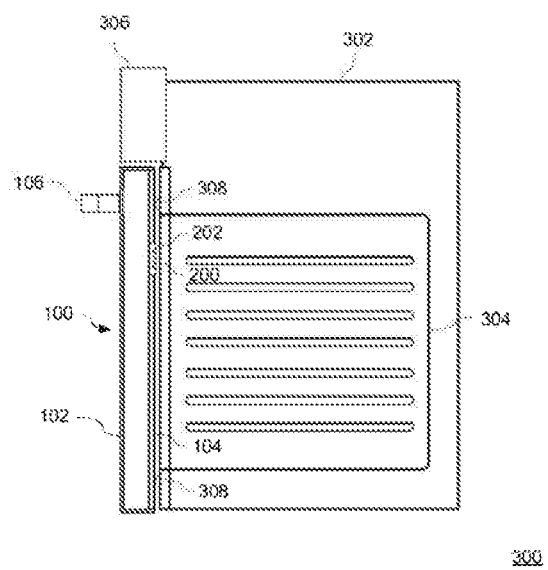
FIG. 1 is a partial cutaway view of a household cooking appliance, according to an exemplary embodiment of the invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1-14 illustrate exemplary embodiments of a household cooking appliance having an oven door with a camera configured to capture video of an interior of the oven chamber. Like reference numerals are used to identify similar features of the example embodiments in FIGS. 1-14.

Figure 2:
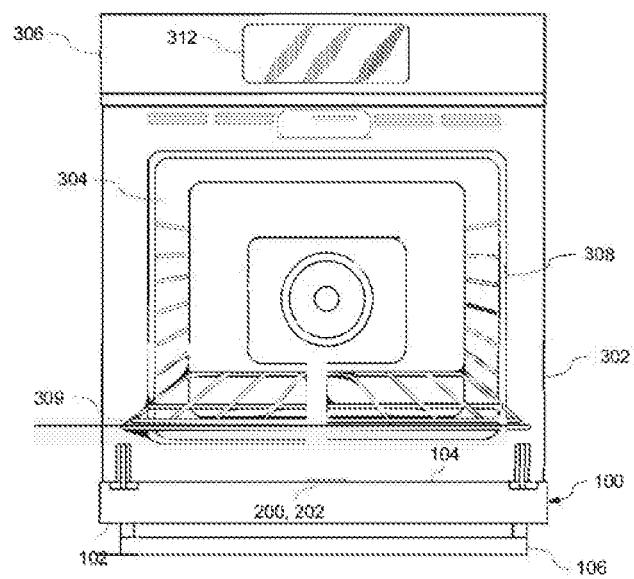
FIG. 2 is a schematic front view of a household cooking appliance, according to an exemplary embodiment of the invention.
Figure 3:
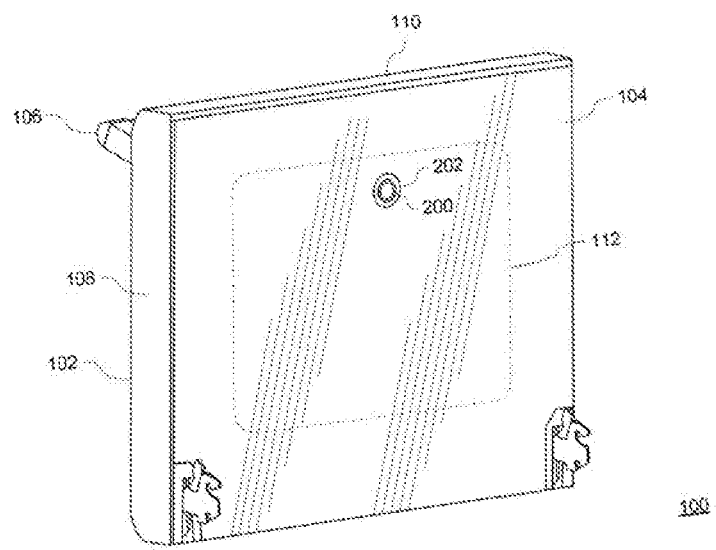
FIG. 3 is a rear perspective view of an oven door of a household cooking appliance, according to an exemplary embodiment of the invention.
Figure 4:
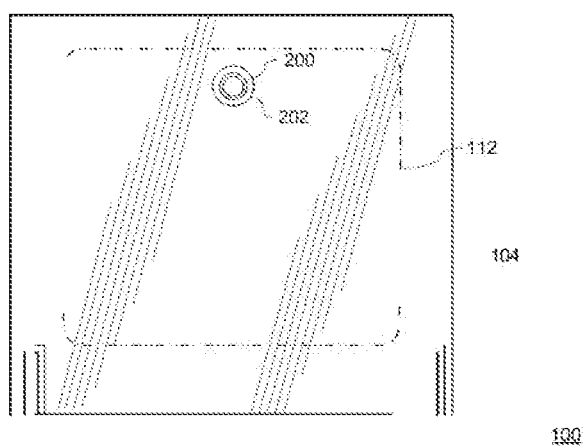
FIG. 4 is a rear view of an oven door of a household cooking appliance, according to an exemplary embodiment of the invention.

With reference to FIGS. 1 and 2, an example of a household cooking appliance 300 will now be described. The household cooking appliance 300 can include a stand-alone appliance, wall mounted appliance, such as a stand-alone oven, wall mounted oven, double oven, combination oven, countertop oven, or a freestanding range having one or more ovens. For example, the household cooking appliance 300 can include a gas or electric wall oven (as shown, for example, in FIGS. 1-13B), or a gas cooking range (as shown, for example, in FIG. 14) having one or more cooking or warming devices, such as a cooktop, gas oven, electric oven, steam oven, convection oven, and/or warming drawer. In other embodiments, the household cooking appliance can include one or more oven cooking chambers without a cooktop. The exemplary household cooking appliance can include one or more doors, such as a baking oven door, a steam oven door, and/or a warming drawer door for providing access to one or more chambers of the housing.

With reference again to FIGS. 1 and 2, an example of a household cooking appliance 300 can include, for example, a gas or electric wall oven having a housing 302 with an oven chamber 304 accessible through an opening, an oven door 100 covering the opening and moveable about a hinge between an open position and a closed position, and a control panel 306 having a user input device 312 for controlling operation of one or more heating elements and/or circulating fans in the oven chamber 304 for performing a preheat operation, cooking operation, etc. The user input device 312 can include one or more control knobs, touch sensitive input devices, etc. for controlling operation of the appliance. The housing 302 can include a gasket 308 surrounding the opening of the oven chamber 304 and sealing the oven door 100 to the opening when the oven door 100 is in the closed position. One or more oven racks 309 or other support devices can be provided within the oven chamber 304. One of ordinary skill will recognize that other configurations are possible.

In the example shown in FIGS. 1 and 2, the oven door 100 has an outer skin having a front surface 102 and an inner surface 104 that faces the oven chamber 304 and is directly exposed to heating of the oven chamber 304 when the oven door 100 is in the closed position, along with a handle 106 for opening and closing the door. The inner surface 104 of the oven door 100 includes a camera 200 configured to capture video of an interior of the oven chamber 304, for example, before, during, or after a preheat function, cooking operation, etc. The camera 200 can be operable in instances in which the appliance 300 is in operation (i.e., the oven is on) as well as in instances when the appliance 300 is not in operation (i.e., the oven is off). The camera 200 can be specifically designed for use in high temperature environments of an oven and/or include a shielding 202 for protecting the camera 200 or its components from the high temperature environment within the oven chamber 304 such that the camera 200 is capable of capturing video imagery from within the oven chamber 304 during a cooking operation (e.g., during a high temperature cooking operation) while being protected from heat damage. One of ordinary skill will recognize that other configurations are possible.

FIGS. 3-6 illustrate an example of a possible oven door 100. The oven door 100 includes an outer door skin having a front surface 102 that faces away from the oven chamber 304, side surfaces 108, a top surface 110, and a bottom surface 116. In an example, the top surface 110 and/or the bottom surface 116 can include a plurality of vents (not shown) for permitting air flow through the door. The oven door 100 includes a handle 106 supported from the outer surface 102 of the door skin by handle mounts. The oven door 100 can include an interior frame supporting the front, sides, top, bottom, and inner surfaces, or one or more of the surfaces can support the other surfaces. The components can be separately or integrally formed. One of ordinary skill will recognize that other configurations are possible.

The oven door 100 has an inner surface 104 that faces the oven chamber 304 and is directly exposed to heating of the oven chamber 304 when the oven door 100 is in the closed position. The inner surface 104 can be, for example, a metal panel, ceramic panel, glass panel, etc., which may be provided with or without a heat reflective coating. In the example shown in FIGS. 3-6, the inner surface 104 of the oven door 100 includes a full glass inner panel formed by a ceramic inner panel (e.g., a transparent ceramic inner panel). The full glass inner panel forming the inner surface 104 can have a low coefficient of thermal expansion capable of withstanding large temperature differentials across an entire surface without breaking and can be formed by a transparent ceramic material commonly used, for example, for fireplace glass (e.g., Robax® or Resistan™, manufactured by SCHOTT North America, Inc.). In another embodiments, the inner surface 104 may include a coating such as a heat reflective coating (e.g., Energy Plus coating), which commonly may be used on fireplace glass. One of ordinary skill will recognize that other configurations are possible.

The oven door 100 can include hinge claws to facilitate pivoting of the oven door 100 with respect to the appliance housing for opening and closing the oven chamber 304. In this example, the oven door 100 is configured as a vertical swing oven door. However, in other examples, the oven door 100 can be configured as a side swing oven door or as a set of divided, two-door side swing oven doors. As shown in the example of FIGS. 3-6, the inner surface 104 of the oven door 100 includes a first portion that is disposed adjacent to an area within the gasket 308 surrounding the opening of the oven chamber 304 when the oven door 100 is in a closed position. The area of the inner surface 104 that contacts and seals against the gasket 308 when the oven door 100 is in a closed position is exemplarily illustrated by the dashed line 112. A second, outer or perimeter portion of the inner surface 104 is disposed outside of the gasket 308 that surrounds the opening to the oven chamber 304, or in other words, outside the area illustrated by the dashed line 112. As a result of this arrangement, the portion of the inner surface 104 that is disposed within the perimeter of the gasket 308 that surrounds the opening to the oven chamber 304 is subjected to heating to the oven cooking temperature along with the oven chamber 304. This area also has a line of sight with the interior of the oven chamber 304 when the oven door 100 is in a closed position.

Figure 5:
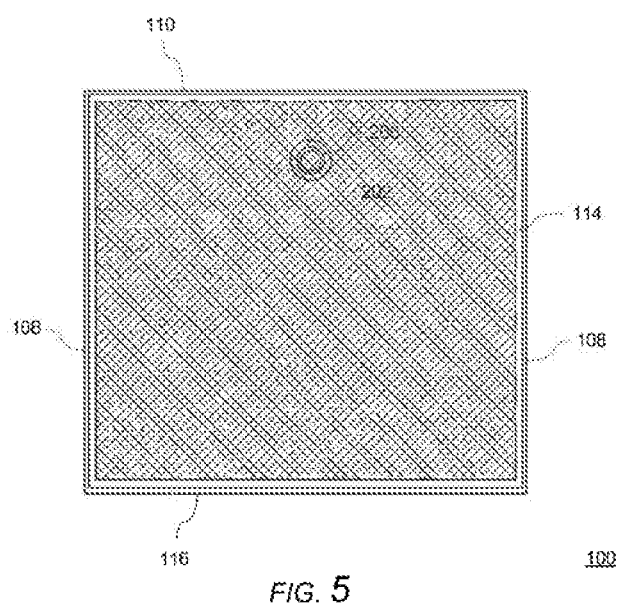
FIG. 5 is a schematic cross-sectional rear view of an oven door of a household cooking appliance, according to an exemplary embodiment of the invention.
Figure 6:
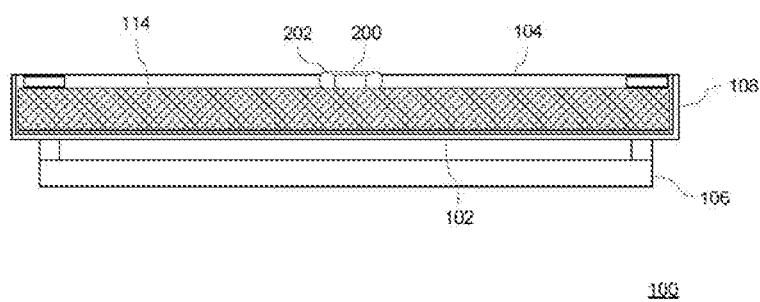
FIG. 6 is a schematic cross-sectional top view of an oven door of a household cooking appliance, according to an exemplary embodiment of the invention.

In the example shown in FIGS. 5 and 6, the oven door 100 includes a continuous outer surface 102 devoid of a glass viewing window and corresponding glass pack (i.e., a so-called solid outer door skin). As a result, the oven door 100 can include a thermal resistant material 114 disposed within the oven door 100 between the outer surface 102 and the inner surface 104 that extends across an entire width and height of the oven door 100 from sidewall to sidewall 108 and from top 110 to bottom 116, or substantially across an entire width and height of the oven door 100 from sidewall to sidewall 108 and from top 110 to bottom 116. In other examples, at least a central region of the oven door 100 includes a thermal resistant material 114 disposed between the outer surface 102 and the inner surface 104, the central region being disposed centrally between an upper edge and a lower edge of the oven door 100 and centrally between a side edge and an opposite side edge of the oven door 100. The thermal resistant material 114 can be uniform thermal resistance across a width and/or height of the oven door 100. In other examples, the thermal resistant material 114 can be have a different thermal resistance at different areas of the door. For example, the thermal resistant material 114 within the oven door 100 and adjacent to or centrally withing the area defined by the dashed line 112 on the inner surface 104, which corresponds to the gasket 308 surrounding the opening to the oven chamber 304, can have a greater thermal resistance than other areas of the thermal resistant material 114, such as one or more areas (e.g., perimeter areas) outside the dashed line 112.

In the example of FIGS. 3-6, the camera 200 can be mounted on the inner surface 104 surface of the oven door 100 and directed toward or facing the oven chamber 304 when the oven door 100 is in a closed position. In another example, the camera 200 can be integrated at least partially within the oven door 100 and directed toward or facing, or partially inserted through, a penetration through the inner surface 104 of the oven door 100 and correspondingly directed toward or facing the oven chamber 304 when the oven door 100 is in a closed position. In yet another example, the camera 200 can be integrated entirely within the oven door 100 and directed toward or facing the inner surface 104, which can be a full glass inner panel that is transparent at least in the region of the camera 200, and correspondingly directed toward or facing the oven chamber 304 when the oven door 100 is in a closed position such that the camera 200 is capable of capturing imagery through the inner surface 104.

The camera 200 can be specifically designed for use in high temperature environments of an oven and/or include a shielding 202 for protecting the camera 200 or its components from the high temperature environment within the oven chamber 304 such that the camera 200 is capable of capturing video imagery from within the oven chamber 304 during or after a cooking operation (e.g., during or after a preheat operation, a high temperature cooking operation, etc.) while being protected from heat damage.

The camera 200 can include a single camera or a plurality of cameras, such as one or more digital cameras. The camera 200 can include a sensor capable of capturing standard definition or high definition images and/or video. The camera 200 can be capable of other features, such as performing zoom or telephoto functions, capturing wide or ultra-wide image fields, capturing images and/or video in low light, capturing visible and/or infrared images and/or video, etc. The camera 200 can have a fixed focal point within the oven chamber 304 when the oven door 100 is in a closed position or the camera 200 can be configured to focus on different locations or levels within the oven chamber 304, such as different oven rack levels and locations. If more than one camera is provided, each camera can have the same capabilities, sensor types, etc., or one or more cameras can have different capabilities, sensor types, etc. The position of the camera 200 is not limited to the position shown in the examples. The camera 200, or cameras, can be disposed at any suitable location and position to enable the camera to capture imagery from within the oven chamber 304 or a desired region or regions of the oven chamber 304.

The shielding 202 for protecting the camera 200 or its components can be specifically designed for use in high temperature environments of an oven such that the camera 200 is insulated from the high temperature environment of an oven and protected from heat damage (e.g., during or after a preheat operation, a high temperature cooking operation, etc.). The shielding 202 can be disposed between the camera 200 and the oven chamber 304, surround all or a portion of the camera 200, encapsulate the camera 200, etc. to protect the camera 200 and/or its components from heat damage. In other examples, the shielding 202 can be coupled to or integrally formed with the inner surface 104 of the oven door 100.

In some examples, the oven door 100 can include a display 120 (e.g., video display screen) on the oven door 100 to display a video feed received from the camera 200 such that a user can view the interior of the over chamber 304 during a cooking operation without opening the oven door 100 and without requiring a viewing window or glass pack.

Figure 7A:
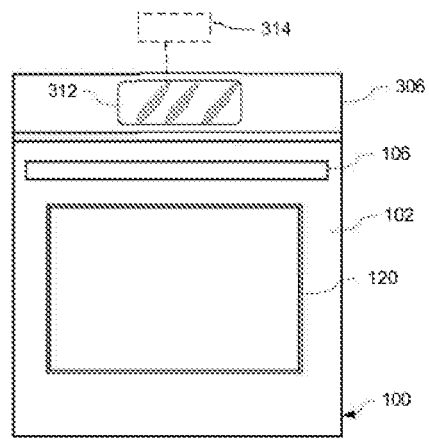
FIG. 7A is a schematic front view of a household cooking appliance having a vertical swing oven door and FIG. 7B is a schematic front view of a household cooking appliance having a side swing oven door, according to an exemplary embodiment of the invention.
Figure 7B:
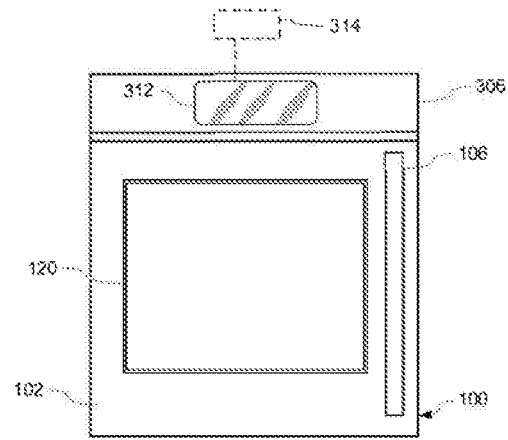

For example, with reference to the examples shown in FIGS. 7A and 7B, the oven door 100 can include a display 120 mounted to (i.e., mounted directly to) the outer surface 102 (e.g., exterior skin) of a vertical swing (FIG. 7A) oven door 100 or a side swing (FIG. 7B) oven door 100. The display screen 120 can be in direct or indirect communication with the camera 200 and configured to display the video captured by the camera 200 of the interior of the oven chamber 304 before, during, or after a cooking operation. In some examples, the household cooking appliance 300 can include a control unit 314, which can be a separate controller or a control unit integrated into the control panel 306. The control unit 314 can be in direct or indirect communication with the camera 200 and/or the display 120 and configured to control the operation of the camera 200 and/or the display 120 and/or to control transmission of the video captured by the camera 200 of the interior of the oven chamber 304 to the display 120. In other examples, the camera 200 can be configured to communicate directly with the display 120 to transmit the video captured by the camera 200 of the interior of the oven chamber 304 to the display 120. In the examples of FIGS. 7A and 7B, the oven door 100 is devoid of a glass viewing window or glass pack. In another example, the display 120 can be integrated into the control panel 312 instead of being provided as a discrete display on the outer surface 102 of the oven door 100.

Figure 8A:
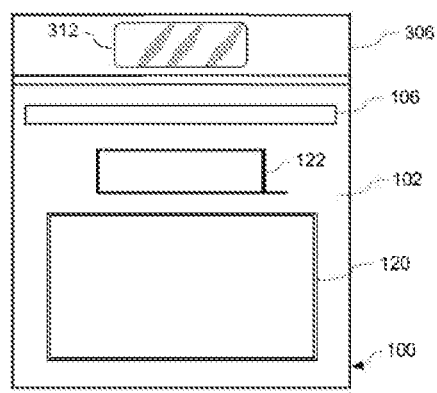
FIG. 8A is a schematic front view of a household cooking appliance having a vertical swing oven door and FIG. 8B is a schematic front view of a household cooking appliance having a side swing oven door, according to an exemplary embodiment of the invention.
Figure 8B:
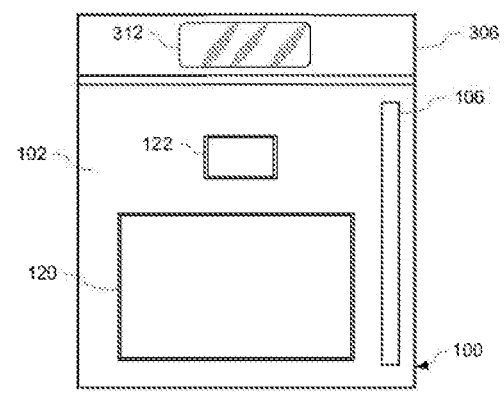

In the examples shown in FIGS. 8A and 8B, an oven door 100 can include both a display 120 on the outer surface 102 of a vertical swing oven door 100 (FIG. 8A) or a side swing (FIG. 8B) oven door 100 along with a glass viewing window and glass pack 122. As shown in FIGS. 8A and 8B, in these examples, the glass viewing window and glass pack 122 can be substantially limited in size and/or smaller than the display 120, thereby minimizing heat loss through the glass viewing window and glass pack 122. The arrangement of the display 120 and glass viewing window and glass pack 122 is not limited to any particular arrangement and the display 120 and glass viewing window and glass pack 122 can be arranged adjacent to each other in a side-by-side arrangement, or an above and below arrangement, among other arrangements.

Figure 9:
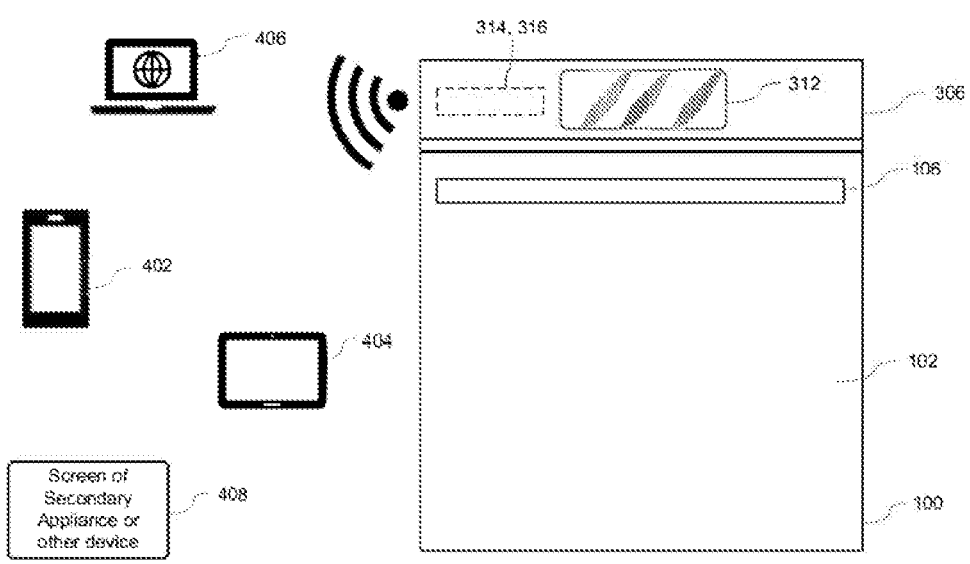
FIG. 9 is a schematic front view of a household cooking appliance, according to an exemplary embodiment of the invention.

With reference to FIG. 9, the oven door 100 having the camera 200 can be configured to have a continuous outer surface (e.g., a so-called solid outer surface or door skin) that is devoid of both a display 120 and a glass viewing window and glass pack 122. In this example, the household cooking appliance 300 further includes a control unit 314 and/or a communications unit 316 that is configured to control the camera 200 and to transmit (e.g., via wired or wireless communication) the video imagery captured by the camera 200 (e.g., a signal or data representing the video imagery) to a display 120 that is remote from the home cooking appliance 300. For example, the control unit 314 and/or a communications unit 316 can be configured to control the operation of the camera 200 to capture video imagery from the interior of the oven chamber 304 and to transmit (e.g., via wired or wireless communication) the video imagery (e.g., a signal or data representing the video imagery) to a display 120 of another device, such as a smart phone 402, tablet computer 404, notebook computer 406, personal or desktop computer (not shown), etc., for example, via an app (e.g., an application for a mobile device) or a web site, to one or more displays 408 on another household appliance, such as another cooking appliance, an adjacent oven, a refrigerator, etc., or to a display on another surface or component, such as a display on a kitchen cabinet, kitchen wall, etc.

One of ordinary skill in the art will recognize that a household cooking appliance 300 having a display 120 and/or a glass viewing window and glass pack 122, as shown for example in FIGS. 7A-8B, also can include a control unit 314 and/or a communications unit 316 that is configured to control the camera 200 and to transmit (e.g., via wired or wireless communication) the video imagery captured by the camera 200 (e.g., a signal or data representing the video imagery) to a display 120 that is remote from the home cooking appliance 300.

In the examples according to the invention, the video imagery captured by the camera 200 can be displayed to a user such that the user can observe the inside of the oven chamber 304, for example, before, during, or after a cooking operation. In an exemplary embodiment, the camera 200 can be configured to be operable (e.g., locally or remotely activated and/or controlled) in instances in which the appliance 300 is in operation (e.g., a heating element, fan, and/or another device of the oven is on) as well as in instances when the appliance 300 is not in operation (e.g., a heating element, fan, and/or another device of the oven is off). For example, the camera 200 can be configured to be operable when the appliance 300 is off such that a user can remotely view the interior of the oven chamber 304 before remotely initiating operation of the cooking appliance 300, such as remotely starting a preheat function, remotely starting a baking or cooking process, etc.

Additionally, in each of the illustrated examples described herein (e.g., FIGS. 1-14), the display 120 (or a control unit 314 or system of the household cooking appliance 300 configured to control the display 120) can be configured to receive (e.g., via wired or wireless communication) and display content from other sources in addition to the camera 200 of the household cooking appliance 300. For example, the content from other sources can include stock or custom "sleep mode" screens including nature, sports teams, nature scenes, personal photos/videos, etc., as selected by a user. The content from other sources also can include additional video imagery captured by a camera of another home appliance, such as an adjacent oven.

Figure 10A:
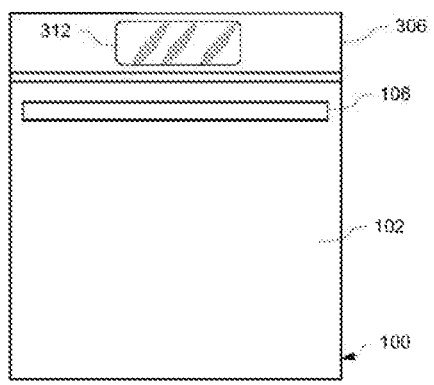
FIG. 10A is a schematic front view of a household cooking appliance having a vertical swing oven door and FIG. 10B is a schematic front view of a household cooking appliance having a side swing oven door, according to an exemplary embodiment of the invention.
Figure 10B:
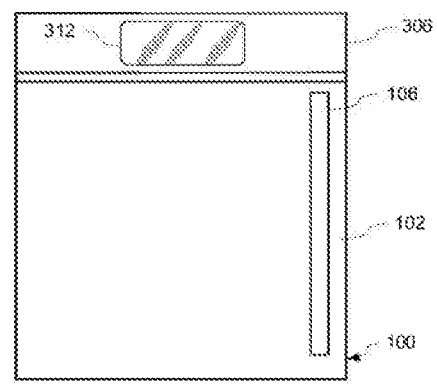

Similar to the example in FIG. 9, the examples illustrated in FIG. 10A (vertical swing oven door) and FIG. 10B (side-swing oven door) can include an oven door 100 having a camera 200 in which the oven door 100 has a continuous outer surface (e.g., a so-called solid outer surface or door skin) that is devoid of both a display 120 and a glass viewing window and glass pack 122. In other examples, the household cooking appliance 300 also can be configured to have a dual or side-by-side arrangement of side-swing oven doors.

Figure 11A:
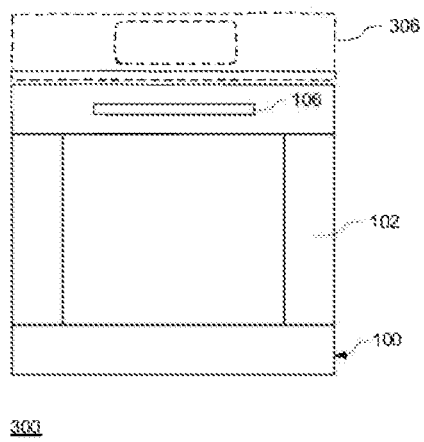
FIG. 11A is a schematic front view of a household cooking appliance having a vertical swing oven door and FIG. 11B is a schematic front view of a household cooking appliance having a side swing oven door, according to an exemplary embodiment of the invention.
Figure 11B:
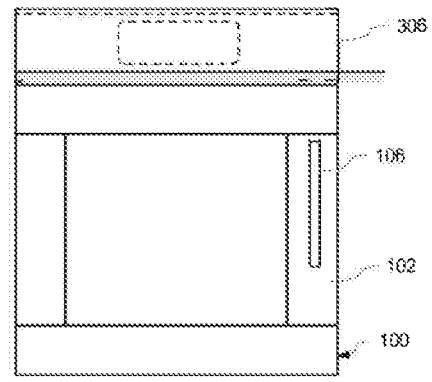
Figure 12A:
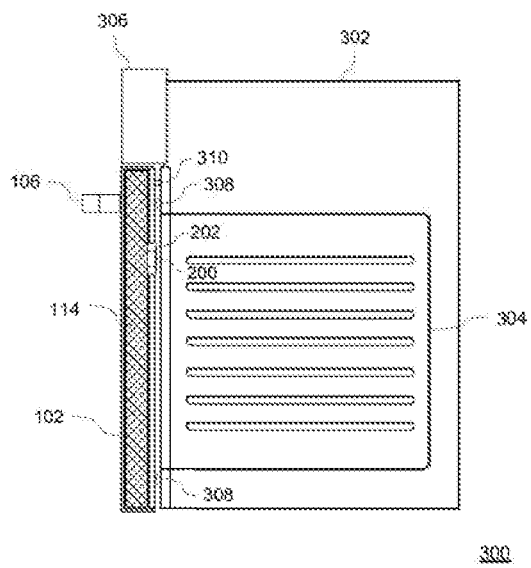
FIG. 12A is a schematic partial cross-sectional side view of a household cooking appliance having a vertical swing oven door in a closed position.
Figure 12B:
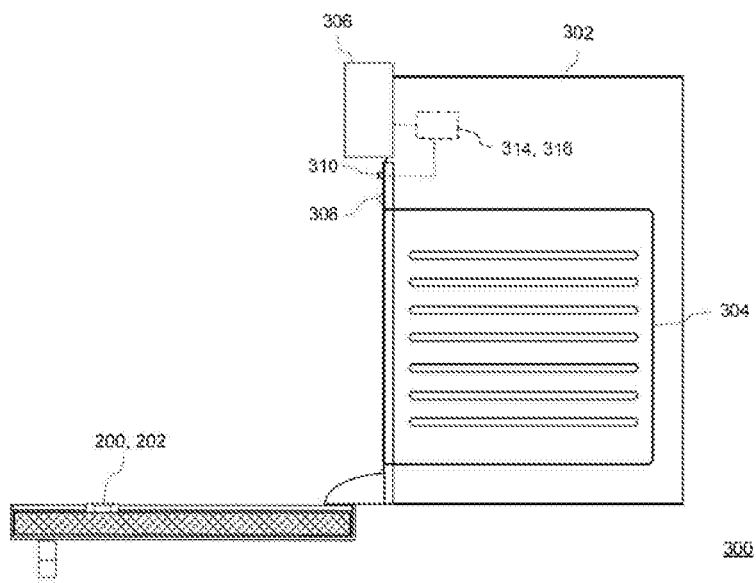
FIG. 12B is a schematic partial cross-sectional side view of a household cooking appliance having a vertical swing oven door in an open position, according to an exemplary embodiment of the invention.

As shown in the examples illustrated in FIGS. 11A and 11B, the oven door 100 being devoid of a glass viewing area in combination with the reduced temperature of the outer surface of the oven door 100 owing to the presence of a thermal resistant material 114 disposed within the oven door 100 between the outer surface 102 and the inner surface 104 and extending across (or substantially across, or at least across a central region) the oven door 100, the outer surface 102 of the oven door 100 can include one or more cabinet panels, such as an ornamental wood cabinet panel, thereby allowing for custom door skins configured to match and integrate the household cooking appliance 300 into the adjacent cabinetry of the kitchen. FIG. 11A illustrates an example of vertical swing oven door 100 having a cabinet panel, while FIG. 11B illustrates an example of side-swing oven door 100 having a cabinet panel. The cabinet panel can include a handle 106 configured to match and integrate the handle 106 with hardware of the adjacent cabinetry of the kitchen.

Figure 13A:
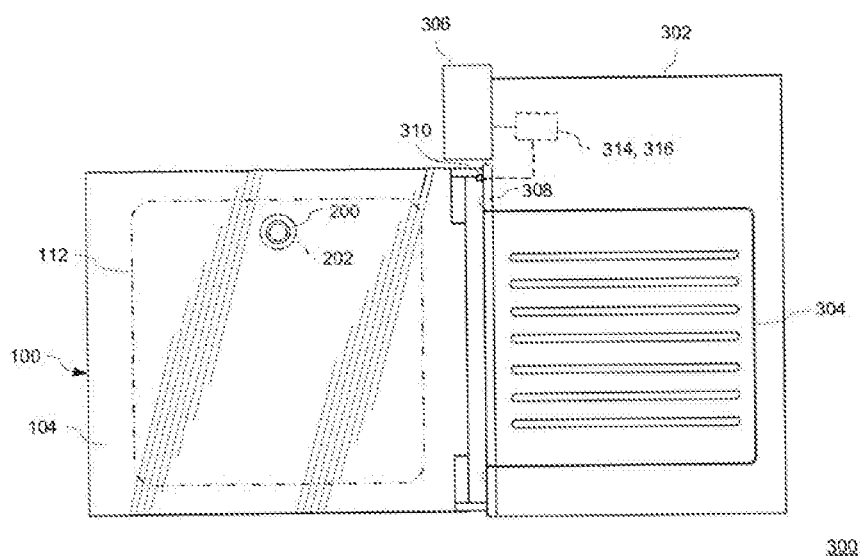
FIG. 13A is a schematic partial cross-sectional side view of a household cooking appliance having a side swing oven door in an open position.
Figure 13B:
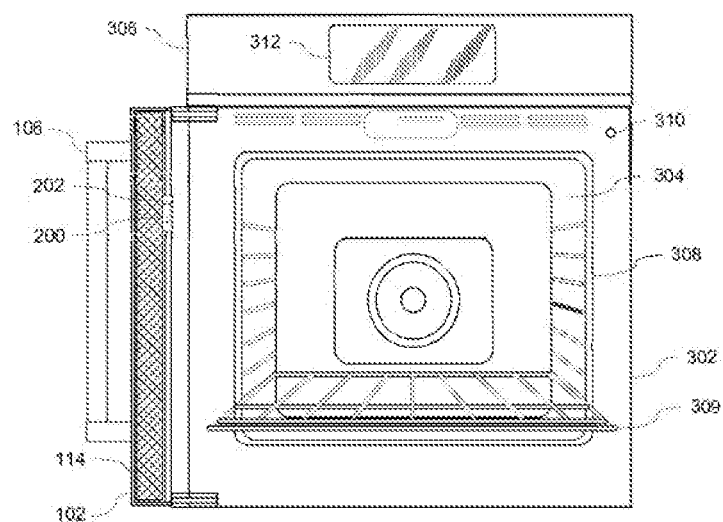
FIG. 13B is a schematic partial cross-sectional front view of a household cooking appliance having a side swing oven door in an open position, according to an exemplary embodiment of the invention.

As described herein and illustrated in the examples shown in FIGS. 12A-13B, household cooking appliances 300 can have various configurations, such as a wall oven, a baking oven or steam oven integrated into a cooking range, or a countertop oven, and such ovens can have various oven door configurations such as one or more vertical swing doors (FIGS. 12A, 12B) or side-swing doors FIGS. 13A, 13B. As shown in each of the examples in FIGS. 12A and 13A, the camera 200 faces directly into the oven chamber 304 when the oven door 100 is in the closed position. Since the oven door 100 has a continuous outer surface (e.g., a so-called solid outer surface or door skin) that is devoid of a glass viewing window and glass pack 122, there is little or no risk of the camera 200 inadvertently capturing imagery from outside of the oven chamber 304. However, as shown in each of the examples in FIGS. 12B and 13B, when the oven door 100 is not in the closed position (i.e., the oven door 100 is in an open position or partially open position), the camera 100 on the oven door 100 may face areas other than the interior of the oven chamber 304 and be capable of inadvertently capturing imagery from areas outside of the oven chamber 304, such as adjacent or surrounding areas of a kitchen, thereby risking a user's privacy being inadvertently being compromised.

As schematically illustrated in the examples of FIGS. 12A-13B, a household cooking appliance 300 can include a privacy control system (e.g., 306, 308, 314, and/or 316) configured to protect a user's privacy from the inadvertent capture of video imagery from areas outside of the oven chamber 304. For example, in the example embodiments, the household cooking appliance 300 can include a control unit 314 that only enables the camera 200 to be activated when the oven door 100 is in the closed position. That is, the camera 200 is de-activated (or prevented from being activated) when the oven door 100 is moved away from the closed position (i.e., when the oven door 100 is in an open or partially open position) and only activated (or capable of being activated) when the oven door 100 is in the closed position. Such a control unit 314 for controlling activation and/or de-activation of the camera 100 based on the position of the oven door 100 can be a separate control unit 314 or integrally provided with the control panel 306. In other examples, one or more discrete control units can be provided for controlling one or more of the operation of the appliance, communications with a display on or remote from the appliance, operation of the camera, and/or controlling activation or de-activation of the camera for privacy purposes.

The household cooking appliance 300 can include, for example, a privacy control system (e.g., 306, 308, 314, and/or 316) including one or more door position sensors 310 in communication with a control unit 314. Such a door position sensor 310 can be configured to detect when the oven door 100 is one of an open position, a partially open position, and/or a closed position. The door position sensor 310 is not limited to any particular type of position sensor and any suitable sensor, or any plurality of sensors or combination of sensors, for detecting a position of the oven door (e.g., a closed position, partial open position, open position, etc.) can be used. For example, the door position sensor 310 can include a mechanical sensor, such as a mechanical plunger-style door position sensor that is physically contacted and depressed by a surface or other part of the door when the oven door is moved into the closed position, as shown in the examples of FIGS. 12A-13B. In other examples, the door position sensor 310 can include an optical sensor configured to detect a position of the oven door 100, an angular position sensor configured to detect a position of the oven door 100 and/or a hinge of the oven door 100, etc. Other sensors also can be used to detect the position of the oven door 100. For example, the present invention can take advantage of a door position sensor used for another purpose, such as turning on and/or off interior lights within the oven cavity 304 during opening and closing of the oven door 100, as detection device to provide an input to a privacy control system for controlling the operation of the camera. The location of such a door position sensor 310 is not limited to the illustrated examples.

Accordingly, as shown in the examples of FIGS. 12A-13B, a household cooking appliance 300 including a camera 200 on an inner surface 104 of the oven door 100, in which the camera 200 is configured to capture video of only an interior of the oven chamber 304, irrespective of whether or not the oven chamber 304 is being used for a cooking operation, and display such captured video of only the interior of the oven chamber 304 to a user, for example, via a display 120 on the household cooking appliance 300, a display 120 on another household appliance, or on a display of a portable device such as a smart phone 402, notepad computer 404, notebook computer 406, etc., or a display of another device 408, etc., without the risk of inadvertent privacy violations.

Figure 14:
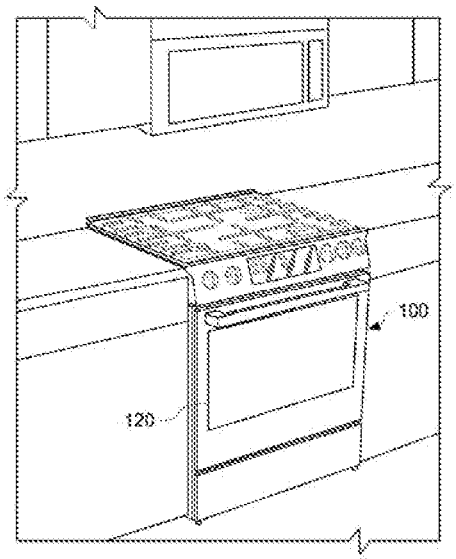
FIG. 14 is a perspective view of a household cooking appliance, according to another exemplary embodiment of the invention.

The exemplary embodiments of the oven door 100 are not limited to the household cooking appliance (e.g., oven) 300 shown in the examples of FIGS. 1-13B and can be applied to one or more oven doors of other appliances, such as a stand-alone range as exemplarily illustrated in FIG. 14.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A household cooking appliance comprising:
a housing having an oven chamber accessible through an opening; and
an oven door covering the opening and moveable about a hinge between an open position and a closed position, the oven door including an inner surface that faces the oven chamber and is directly exposed to heating of the oven chamber when the door is in the closed position, the inner surface of the oven door including a camera configured to capture video of an interior of the oven chamber; and
a control unit that enables the camera to be activated only when the oven door is in the closed position.

2. The household cooking appliance of claim 1, wherein the oven door includes shielding configured to protect the camera from exposure to the heating of the oven chamber.

3. The household cooking appliance of claim 1, wherein the oven door includes a thermal resistant material disposed within the oven door between an outer surface of the oven door and the inner surface of the oven door and extending across substantially an entire width and substantially an entire height of the oven door.

4. The household cooking appliance of claim 1, wherein a central region of the oven door includes a thermal resistant material disposed within the oven door between an outer surface of the oven door and the inner surface of the oven door, the central region being disposed centrally between an upper edge and a lower edge of the oven door and centrally between a side edge and an opposite side edge of the oven door.

5. The household cooking appliance of claim 1, further comprising:
a display screen on an outer surface of the oven door, the display screen configured to display the video captured by the camera of the interior of the oven chamber.

6. The household cooking appliance of claim 5, wherein the oven door further comprises:
a glass viewing window that permits viewing the interior of the over chamber, the glass viewing window being disposed adjacent to the display screen.

7. The household cooking appliance of claim 1, wherein an outer surface of the oven door includes a continuous outer skin devoid of a glass viewing window.

8. The household cooking appliance of claim 1, wherein an outer surface of the oven door includes a cabinet panel.

9. The household cooking appliance of claim 1, wherein the oven door is a vertical swing door.

10. The household cooking appliance of claim 1, wherein the oven door is a side swing door.

11. The household cooking appliance of claim 1, further comprising:
a door position sensor in communication with the control unit, the door position sensor configured to detect when the oven door is disposed in at least one of the open position and the closed position.

12. The household cooking appliance of claim 1, further comprising:
the control unit having a communication module configured to wirelessly transmit a signal representing the video captured by the camera to a device external to the household cooking appliance.

13. The household cooking appliance of claim 12, wherein the device external to the household cooking appliance is one of a smart phone, a personal computer, a laptop computer, and a tablet computer.

14. household cooking appliance of claim 12, wherein the device external to the household cooking appliance is another household kitchen appliance having a display screen.

15. The household cooking appliance of claim 1, further comprising:
the control unit having a communication module configured to receive a signal representing one of image data and video data from a source external to the household cooking appliance,
wherein the display is configured to display one of an image and a video represented by the one of the image data and the video data received by the control unit.

16. The household cooking appliance of claim 1, wherein the camera is configured to capture video of the interior of the oven chamber in instances when the heating of the oven chamber is being performed and when the heating of the oven chamber is not being performed.

* * * * *